US012791005B2

(12) United States Patent
Lakos et al.

(10) Patent No.: US 12,791,005 B2
(45) Date of Patent: Nov. 10, 2026

(54) WAVE ENERGY CONVERTER

(71) Applicant: Oscillating Wave Energy Limited, Douglas (IE)

(72) Inventors: Istvan Lakos, Passage West (IE); Bela Balogh, Middleton (IE)

(73) Assignee: Oscillating Wave Energy Limited, Douglas (IE)

( * ) Notice: Subject to any disclaimer, the term of this patent is extended or adjusted under 35 U.S.C. 154(b) by 128 days.

(21) Appl. No.: 18/778,303

(22) PCT Filed: Jan. 27, 2023

(86) PCT No.: PCT/EP2023/052091
§ 371 (c)(1),
(2) Date: Jul. 19, 2024

(87) PCT Pub. No.: WO2023/105098
PCT Pub. Date: Jun. 15, 2023

(65) Prior Publication Data

US 2025/0305474 A1 Oct. 2, 2025

(30) Foreign Application Priority Data

Jan. 27, 2022 (IE) .................................... 2022/0018

(51) Int. Cl.
*F03B 13/18* (2006.01)
*F03B 13/20* (2006.01)

(52) U.S. Cl.
CPC .......... *F03B 13/1895* (2013.01); *F03B 13/20* (2013.01); *F05B 2210/11* (2013.01); *F05B 2220/706* (2013.01); *Y02E 10/30* (2013.01)

(58) Field of Classification Search
CPC .................. F03B 13/1895; F03B 13/20; F05B 2220/706; Y02E 10/30
See application file for complete search history.

(56) References Cited

U.S. PATENT DOCUMENTS 1,018,678 A * 2/1912 Nelson .................... F02B 63/04 290/40 R
1,303,897 A * 5/1919 Heckerman ......... F03B 13/1885 60/504

(Continued)

FOREIGN PATENT DOCUMENTS

CN 104755750 A * 7/2015 .............. F03B 13/20
DE 2505290 A1 8/1976

(Continued)

OTHER PUBLICATIONS

Lakos, Istvan, PCT Patent Application No. PCT/EP2023/052091, filed Jan. 27, 2023, Notification of the Transmittal of the International Search Report and the Written Opinion of the International Searching Authority, or the Declaration, mailed Jun. 28, 2023, 15 pages.

*Primary Examiner* — Pedro J Cuevas
(74) *Attorney, Agent, or Firm* — Steinberger IP Law; Brian S. Steinberger; Hilary F. Steinberger

(57) ABSTRACT

The disclosure relates to a high efficiency, low maintenance, simple, pressure receptacle wave energy converter device comprising a converter/generator unit such as a flywheel aided generator (which is located, in use, on a floating body), a buoyancy aided pressure receptacle unit located, in use, below the surface of the water, and a means of connecting/tethering the pressure receptacle with the converter. The device permits the capture of buoyant wave energy imparted to the pressure receptacle and the conversion of the captured energy into electrical energy thus directly producing or storing electrical energy from the captured kinetic energy of the waves.

15 Claims, 8 Drawing Sheets

(56) References Cited

U.S. PATENT DOCUMENTS 3,965,365 A * 6/1976 Parr .................... F03B 13/1815 416/61
4,081,962 A * 4/1978 Liu ......................... F03B 13/20 417/328
4,092,828 A * 6/1978 Garza ................. F03B 13/1815 60/505
4,125,346 A * 11/1978 Pickle ....................... F04B 9/02 60/506
4,208,878 A * 6/1980 Rainey .................. F03B 13/262 60/398
4,228,360 A * 10/1980 Navarro .............. F03B 13/1885 290/43
4,241,579 A * 12/1980 Borgren .............. F03B 13/1885 60/507
4,389,843 A * 6/1983 Lamberti ............ F03B 13/1815 60/507
4,421,461 A * 12/1983 Hicks ..................... B01D 61/10 210/416.1
4,434,375 A * 2/1984 Taylor ................. F03B 13/1885 60/504
4,781,023 A * 11/1988 Gordon ................... F03B 13/20 60/505
4,931,662 A * 6/1990 Burton ................ F03B 13/1815 60/507
5,359,229 A * 10/1994 Youngblood ....... F03B 13/1855 60/507
5,424,582 A * 6/1995 Trepl, II ............. F03B 13/1865 60/507
5,889,336 A * 3/1999 Tateishi ............. F03B 13/1865 290/43
5,921,082 A * 7/1999 Berling ............... F03B 13/1815 60/495
6,681,572 B2 * 1/2004 Flory ........................ E02B 9/08 60/497
7,042,112 B2 * 5/2006 Wood .................... F03B 13/187 290/43
7,319,278 B2 * 1/2008 Gehring .............. F03B 13/1885 290/53
7,459,802 B2 * 12/2008 Loui ................... F03B 13/1815 290/53
7,770,390 B2 * 8/2010 Wegener ................. F03B 13/16 60/497
8,084,877 B1 * 12/2011 Raisch ................ F03B 13/1865 290/53
8,450,870 B1 * 5/2013 Stevens ................... F03B 13/00 290/54
8,564,150 B2 * 10/2013 Shpinev .................. F03B 13/20 60/504
8,901,766 B2 * 12/2014 Werjefelt ............ F03B 13/1885 290/53
9,528,491 B2 * 12/2016 Hench ....................... E02B 9/08
9,790,914 B2 * 10/2017 Lee ......................... F03B 15/00
10,227,961 B2 * 3/2019 Dragic .................... F03B 13/20
10,267,286 B2 * 4/2019 Larsen .................... B63B 22/02
10,400,741 B2 * 9/2019 Gregory ................ F03B 13/188
10,767,617 B2 * 9/2020 Mundon ................. F03B 13/20
10,801,465 B2 * 10/2020 Hench ..................... F15B 11/08
11,125,204 B2 * 9/2021 Dragic .................. F03B 13/189
11,536,241 B2 * 12/2022 Qu ...................... F03B 13/1885
11,591,999 B2 * 2/2023 Dragic .................... F16H 3/003
11,674,495 B2 * 6/2023 Correa Antunes ...... F03B 13/20 290/53
2006/0202483 A1 * 9/2006 Gonzalez ................ F03B 13/24 290/53
2006/0273594 A1 * 12/2006 Gehring .............. F03B 13/1885 290/42
2008/0122225 A1 * 5/2008 Smith ................. F03B 13/1815 290/53
2008/0206077 A1 8/2008 Royset
2008/0217921 A1 * 9/2008 Raftery ............... F03B 13/1885 290/53
2008/0260548 A1 * 10/2008 Ahdoot ................. F03B 13/186 417/552
2008/0284173 A1 * 11/2008 Stansby .............. F03B 13/1865 290/53
2009/0211240 A1 * 8/2009 Patton ................... F03B 13/262 60/504
2009/0322092 A1 * 12/2009 Werjefelt ................ F03B 13/20 290/53
2010/0064679 A1 * 3/2010 Straume .............. F03B 13/1885 60/507
2010/0270797 A1 * 10/2010 Stansby .............. F03B 13/1885 290/53
2011/0042954 A1 * 2/2011 Werjefelt ................ F03B 13/20 290/53
2012/0013127 A1 * 1/2012 Shpinev .................. F03B 13/20 60/504
2012/0285544 A1 * 11/2012 Westby ............... F03B 13/1845 137/1
2013/0160444 A1 6/2013 Foster
2013/0341927 A1 12/2013 Murphree
2015/0211478 A1 * 7/2015 Dragic ................ F03B 13/1875 60/505
2016/0032887 A1 * 2/2016 Patton ................ F03B 13/1865 60/504
2016/0138556 A1 * 5/2016 Lee ..................... F03B 13/1855 290/42
2016/0333847 A1 * 11/2016 Gregory .................. F03B 13/20
2017/0009732 A1 1/2017 Mundon
2017/0363058 A1 12/2017 Etherington
2019/0010915 A1 1/2019 MacDonald
2019/0249642 A1 * 8/2019 Dragic .................... F03B 13/18
2019/0285044 A1 * 9/2019 Dragic ................ F03B 13/1885
2019/0360452 A1 * 11/2019 Qu ...................... F03B 13/1875
2020/0240388 A1 * 7/2020 Dragic ...................... H02K 7/02
2022/0003201 A1 * 1/2022 Dragic .................. F03B 13/186
2022/0065216 A1 * 3/2022 Correa Antunes .... F03B 13/262
2022/0403809 A1 * 12/2022 Sidenmark ............ F16F 9/0218

FOREIGN PATENT DOCUMENTS

DE 102010015156 A1 6/2011
DE 202013011989 U1 * 1/2015 ........... B25H 1/0035
GB 2408075 A * 5/2005 .......... F03B 13/1865
GB 2575705 A * 1/2020 .............. F03B 13/20
GB 2579640 A 7/2020
GB 2604030 A * 8/2022 .............. F03B 13/18
NO 20093401 A1 * 5/2011 .......... F03B 13/1875
NO 331603 B1 * 2/2012 .......... F03B 13/1885
WO WO-2009034402 A1 * 3/2009 .......... F03B 13/1855
WO WO-2010117291 A1 * 10/2010 .............. F03B 13/20
WO WO-2011065838 A1 * 6/2011 ............ F03B 13/182
WO WO-2012010518 A1 * 1/2012 ............ F03B 13/186
WO WO-2016120599 A1 * 8/2016 ............. B63B 1/107
WO WO-2019241861 A1 * 12/2019 .......... F03B 13/1865
WO WO-2024045606 A1 * 3/2024 .............. F03B 13/14
WO WO-2024107476 A1 * 5/2024 .............. F03B 13/20

* cited by examiner

WAVE ENERGY CONVERTER

The present invention defines a highly efficient method of capturing wave energy, harnessing different wave heights, frequencies and ocean swells at different sea conditions.

The present invention offers a cost effective and low maintenance design, with few moving parts and self-directing capabilities, suitable for either close-to-shore operations or deep sea operations. The present invention is a highly efficient but simple system, with high conversion ratio and energy generation. In particular, the small footprint of the invention makes it uniquely suitable for environments in which larger more complex devices would not be appropriate.

According to a first aspect of the invention there is provided a device for harnessing kinetic wave energy and converting said kinetic wave energy into electrical energy, the device comprising a pressure receptacle comprising;

an impervious sidewall through which fluids cannot pass;

at least one integrated buoyancy unit on the impervious sidewall; a base which is connected to the sidewall to form a closed end; and an open upper end;

a tethering cable;

a converter for converting kinetic energy translated from wave motion into electrical energy; and a means for connection to a floating body;

wherein, in use, the pressure receptacle is connected in tension within a water column via the tethering cable to a tethering mechanism in the converter which is located on a floating body;

such that, fluctuations of waves cause movement of the floating body on which the converter is located, thus varying the tension in the tethering cable in a cyclical manner to convert kinetic wave movement into electrical energy, whereby, a flow of water through the pressure receptacle on upward wave movement increases pressure on the pressure receptacle thus resulting in an extension of the tethering cable and flow of water through the pressure receptacle on downward wave movement decreases pressure on the pressure receptacle thus resulting in a retraction of the tethering cable.

Preferably, the base of the pressure receptacle comprises at least one check valve.

Preferably, the at least one check valve comprises a passive or active means of modulation.

Preferably, the converter comprises a flywheel and generator.

Preferably, the converter comprises a hydraulic arm.

Preferably, the tethering cable comprises a pulley mechanism.

Preferably, the tethering cable is fitted with a variable tension mechanism.

Preferably, the integrated buoyancy unit comprises non elastic sidewalls.

Preferably, the pressure receptacle is made from high strength materials.

Preferably the pressure receptacles are integrated together into a single unit.

Preferably, the device comprises a plurality of pressure receptacles.

Preferably, the device comprises a vessel.

Preferably, the device comprises a plurality of pressure receptacles and one or more converters located on a floating body.

Preferably, a farm is provided comprising a plurality of devices wherein the devices are interconnected.

Preferably, there is provided a method of harnessing wave energy from a particular location with the device and converting said kinetic wave energy into electrical energy, the method comprising the following steps:

i. assessing the wave environment of the location in order to predict wave types and wave heights;

ii. based on the predicted wave environment, configuring the device with a specific pressure receptacle volume, a tethering cable of suitable length and generator of suitable capacity;

iii. connecting the floating body to a mooring point such that the device is fixed in the location and able to sway freely; and iv. connecting the converter to a generator, electrolysis apparatus, battery or other means of distributing or storing the electrical energy.

Preferably, a generator is connected to flywheel in order to generate electricity from the harnessed wave energy.

Preferably, a processor is provided to control the working parameters of the generator for various different wave conditions.

Preferably, motion sensors are provided in order to monitor the movement of the waves.

Preferably, sensors are provided to monitor the velocity of the components of device.

Preferably, sensors are provided to monitor the energy generated by the device.

Preferably, a three axis accelerometer is provided.

Preferably, all the components of the device are produced from recycled material.

BACKGROUND ART

The best property of the wave energy (especially swells) is that it will never run out. There will always be waves forming in large bodies of water, crashing upon the shores of nations near populated coastal regions. Unlike fossil fuels, which are running out in some places in the world, just as quickly as people can discover them; unlike ethanol, a corn product; waves and swells are not limited by a season.

They require no input from man to make their power, and they can always be relied upon.

Also, unlike fossil fuels, creating power from waves creates no harmful by-products such as gases, waste, and pollution. The energy from waves can be taken directly into electricity producing machinery and used to power generators and power plants nearby. In today's energy-powered world, a source of clean energy is hard to come by.

Another benefit of using wave energy is its nearness to places that can avail of it. Lots of big cities and harbours are next to the ocean and can harness the power of the waves for their use. Coastal cities tend to be well-populated, so lots of people can benefit from wave energy plants.

The biggest advantage of wave power in comparison to most other alternative energy sources is that it is easily predictable and forecasting can be used to calculate the amount of energy that can be produced at a certain location. Wave energy is consistent and proves much more reliable than other sources that are dependent on wind or sun exposure.

Unlike fossil fuels, which cause massive damage to land and the seas/oceans (they can leave large holes while extracting energy from them and cause environmental disasters), wave power does not cause any damage to the earth. Waves exist, regardless of whether they are harvested for energy or not. Wave energy is safe, clean, and one of the preferred methods to extract energy from the ocean.

Wave energy is a very reliable source of energy. It is because waves are almost always in motion. Although there are ebbs and tides, the average motion always remains. Thus, energy can be harnessed continuously. It is a fact that the amount of energy that is produced and transported through the waves varies from season to season and from year to year, however, energy production from waves is continuous.

As clean as wave energy is, it still creates hazards for some of the creatures near it. Large machines have to be put near and in the water in order to gather energy from the waves. These machines disturb the seafloor, change the habitat of the marine life and create noise that disturbs the sea life around them. There is also a danger of toxic chemicals that are used on wave energy platforms spilling and polluting the water near them.

Current wave power technologies are highly dependent on wave speed, wavelength wave height and water density. They normally require a consistent flow of powerful waves to generate a significant amount of wave power. Some areas experience unreliable wave behaviour, and it becomes unpredictable to forecast accurate wave power and, therefore, cannot be trusted as a reliable energy source, unless the device used is flexible in terms of energy production.

The future of wave energy is very bright. This form of energy has a lot of potential. With awareness growing among the masses regarding renewable and non-renewable resources, it is essential that the masses lean towards the more sustainable resources of energy.

OBJECTIVE OF THE INVENTION

The pressure receptacle wave energy converter, hereinafter referred to as the device, overcomes most of the challenges which are currently topical in the field of energy generation. The device offers an economically viable option not only over fossil fuels, but over other wave energy converters and renewable technologies, as all currently available wave energy converters are limited by design in terms of efficiency, energy generation and/or cost.

Most countries lack the necessary hours of sun to propel photovoltaic energy or they lack steady and forceful winds, geothermal or hydropower although as 55% of the world's population resides near a coastline, this could be a viable option to generate sustainable and reliable source of energy from ocean and sea swells/waves.

A common problem for most wave energy converters, is that they are designed for certain sea conditions for efficiency, whereas the present invention is suited to harness all of the energy, regardless of the conditions.

As most wave energy converters require anchoring of the device vertically to the seabed, they are limited to be efficiently used with changing weather conditions, changing tides and wave patterns. The present invention uses a technique involving a buoyancy aided pressure receptacle unit, suspended in a body of the water, under a high buoyancy floating body, where vertical anchoring of the system to the seafloor is not required. It will be appreciated that the term floating body can refer to a device specific floating platform or it could be a standard seafaring vessel. The present invention remains suspended and stationery in the body of water freely, without disturbing the environment or the seabed and benefits from sustaining its position regardless of any changes in the conditions above the surface of the body of the water, resulting in energy conversion in the full spectrum of wave/swell heights, patterns and frequencies through its design. As the floating body only requires anchoring from a directional point of view (or the floating body could be connected in a grid in a farm configuration), the floating body has the advantageous ability to rotating 360° around the directional point anchoring, thus accessing a variety of positions depending on changing tides, wave directions, swells and wind.

Most wave energy generators are too complex and therefore too expensive to produce and maintain, as they are subjected to corrosive elements under water. The design in question aims to reduce the complexity to an acceptable level thus increasing reliability and productivity, at a highly competitive cost.

Most traditional wave energy converters utilize the upward buoyant pressure of waves to achieve horizontal tension between the floating body and the seafloor or they use the pressure differential of passing waves. The current invention aims to use the buoyant lifting pressure of the passing waves/swells which lifts the floating body thus harnessing all the buoyant energy resulting from a cyclical vertical movement between the submerged buoyancy aided pressure receptacle and the floating body, from the smallest to the largest divergence, all across the spectrum.

BRIEF DESCRIPTION OF DRAWINGS

Certain preferred embodiments of the present invention will now be described, by way of example only, with reference to the accompanying drawings in which.

DETAILED DESCRIPTION

Figure 1A:
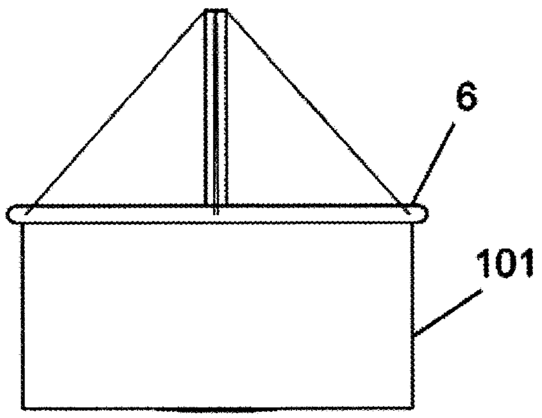
FIG. 1*a* illustrates one of the variations of the design of the pressure receptacle 101 of the device 100, with a parabolic bottom plate, side walls (with integrated buoyancy aid(s) 6), a skirt, and triangular plate check-valves 14 integrated into the bottom plate.
Figure 1B:
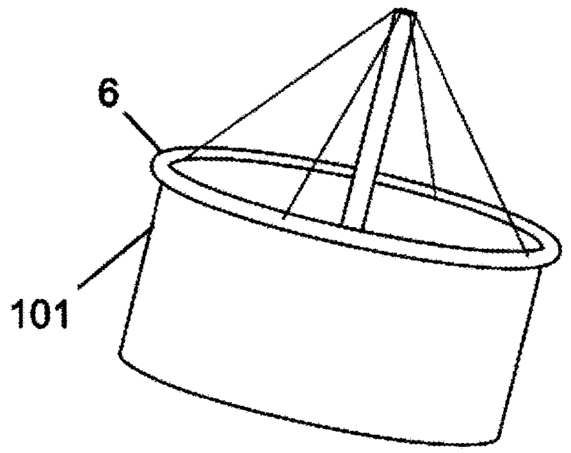
FIG. 1*b* illustrates a perspective view from above of the pressure receptacle of FIG. 1*a;*
Figure 1C:
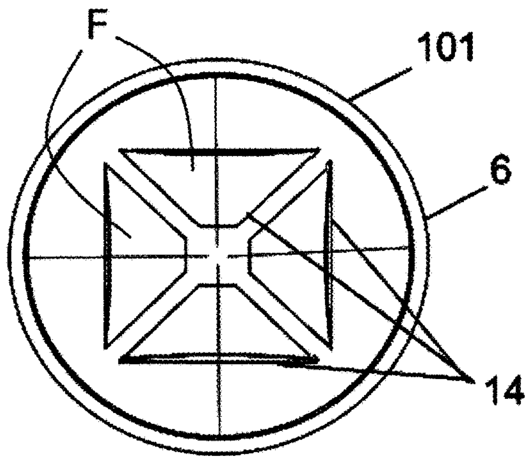
FIG. 1*c* illustrates a plan view of the pressure receptacle of FIG. 1*a;*
Figure 1D:
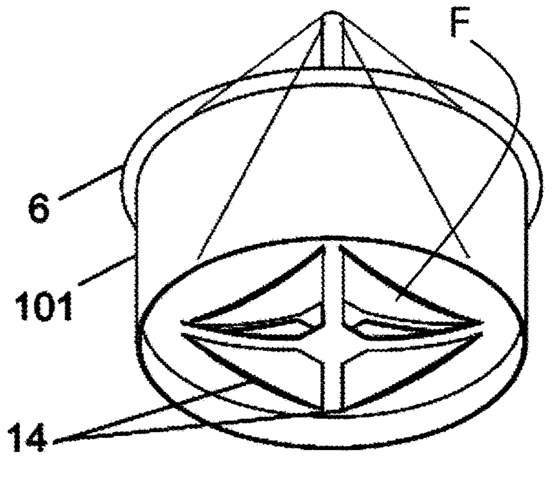
FIG. 1*d* illustrates a perspective view from below of the pressure receptacle of FIG. 1*a;*

Various embodiments of the present invention will now be described in detail with reference to the drawings, where like reference numerals represent like parts and assemblies throughout the several views.

Referring now the accompanying drawings, there is illustrated a variety of embodiments of a device, generally indicated as 100, comprising a pressure receptacle 101 with integrated buoyancy aids 6, attached to a converter 10 in the form of a flywheel and/or generator. The pressure receptacle 101 comprises sidewalls and a base. One end of the pressure receptacle 101 is open thus allowing water into the pressure receptacle 101. The other end of the pressure receptacle 101 is closed as the base is attached to the sidewalls. The closed end of the pressure receptacle 101 ensures that water stays in the pressure receptacle 101 thus allowing pressure to build up in the pressure receptacle 101.

The shape of the pressure receptacle 101 with vertical sidewalls is the optimal configuration. Vertical sidewalls ensures that the mass of water pressure is captured when the water enters the pressure receptacle 101. In a further embodiment, a minimal lean of the sidewalls, towards the middle of the pressure receptacle 101, results in a venturi effect during wave-action, resulting in higher efficiency.

The concave base on the bottom end of the pressure receptacle 101 serves the purpose of structural strength of the pressure receptacle 101 during wave motion. The concave base may also channel the water pressure to close the check-valves 14 as fast as possible (in embodiments where the check valves 14 are present).

By incorporating the buoyancy aids 6 into the pressure receptacles 101, the design is very simple and of low complexity thus diminishing the overall mass of the pressure receptacle 101 and therefore the strain on the tethering cable 4, so that the weight of the pressure receptacle 100 is minimal, although the mass of water pressure can be scaled up easily.

The device 100 is designed to easily and efficiently capture the energy of increased buoyant pressure of waves affecting the floating body 16 (for example capillary waves or gravity surface waves and swells), amplify the energy and distribute the energy into a suitable energy conversion means in order to convert the energy into electrical energy or store the energy. Due to the highly adaptable nature of the device 100, the device 100 is suitable for a wide variety of sea and lake applications ranging from close to shore locations to deep sea. The device 100 can be employed to capture energy from a wide variety of waves of different wave heights, including capillary waves (rolling motion), chop and gravity surface waves/swells.

The design 100 of the pressure receptacle 101 means that the pressure receptacle 101 serves as an artificial rigid anchoring point. It is not a damper/heave plate.

The device 100 is self adjusting into wave and wind direction, as the receptacles are not connected to the seafloor.

Figure 2:
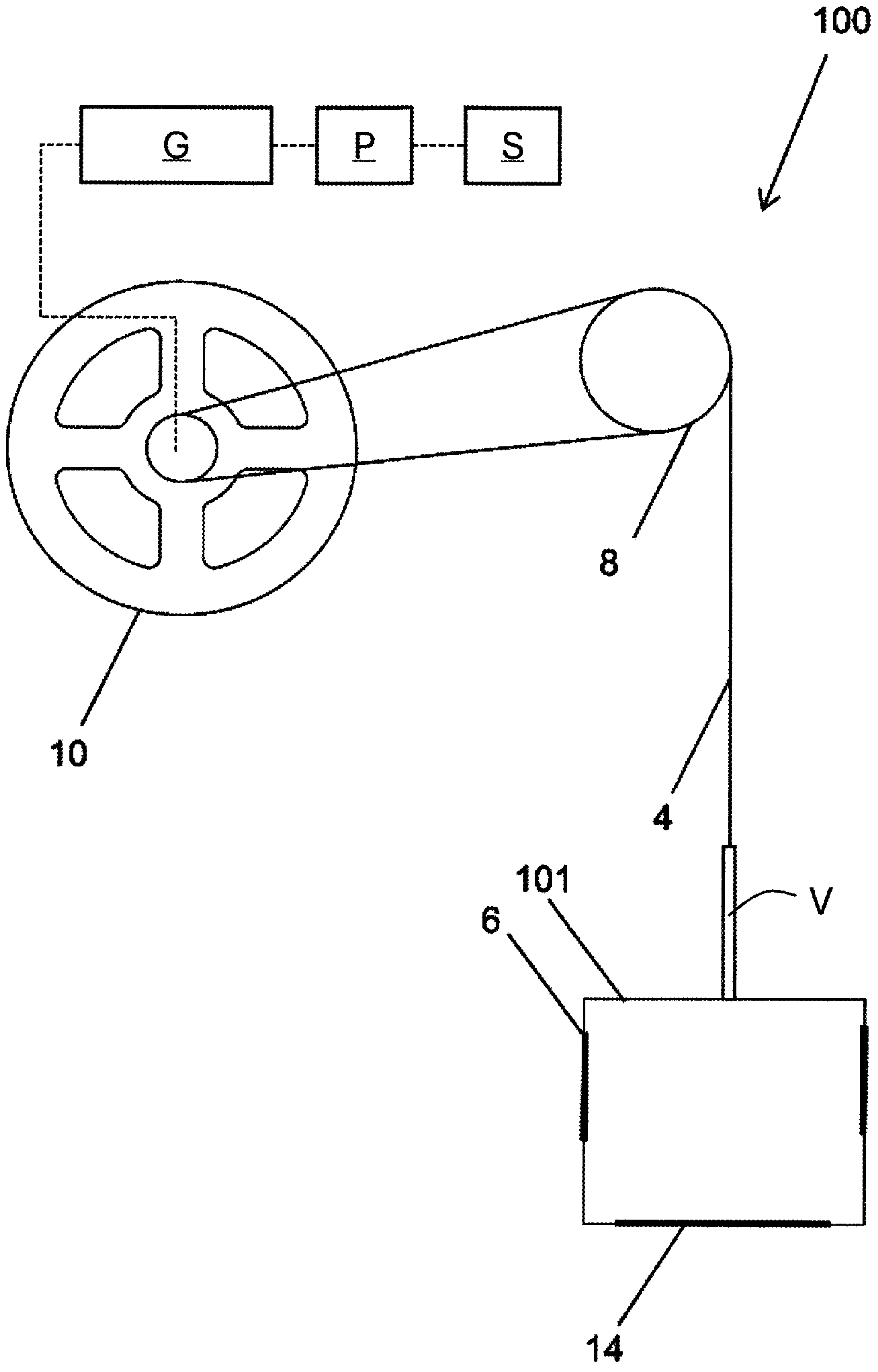
FIG. 2 illustrates a simplified schematic of the device 100 comprising the pressure receptacle 101 with integrated buoyancy aid 6 and integrated check valves 14, a tethering cable 4, an optional flywheel and a converter 10, and a tension reeling device 8.

FIG. 2 illustrates a simplified schematic view of a preferred embodiment of a device 100 according to the present invention, wherein the device 100 is attached to a converter/generator 10 such that the converter/generator 10 converts the wave energy of the wave as harnessed by the device 100 into an energy form that can be stored or input into a component for use.

Figure 3:
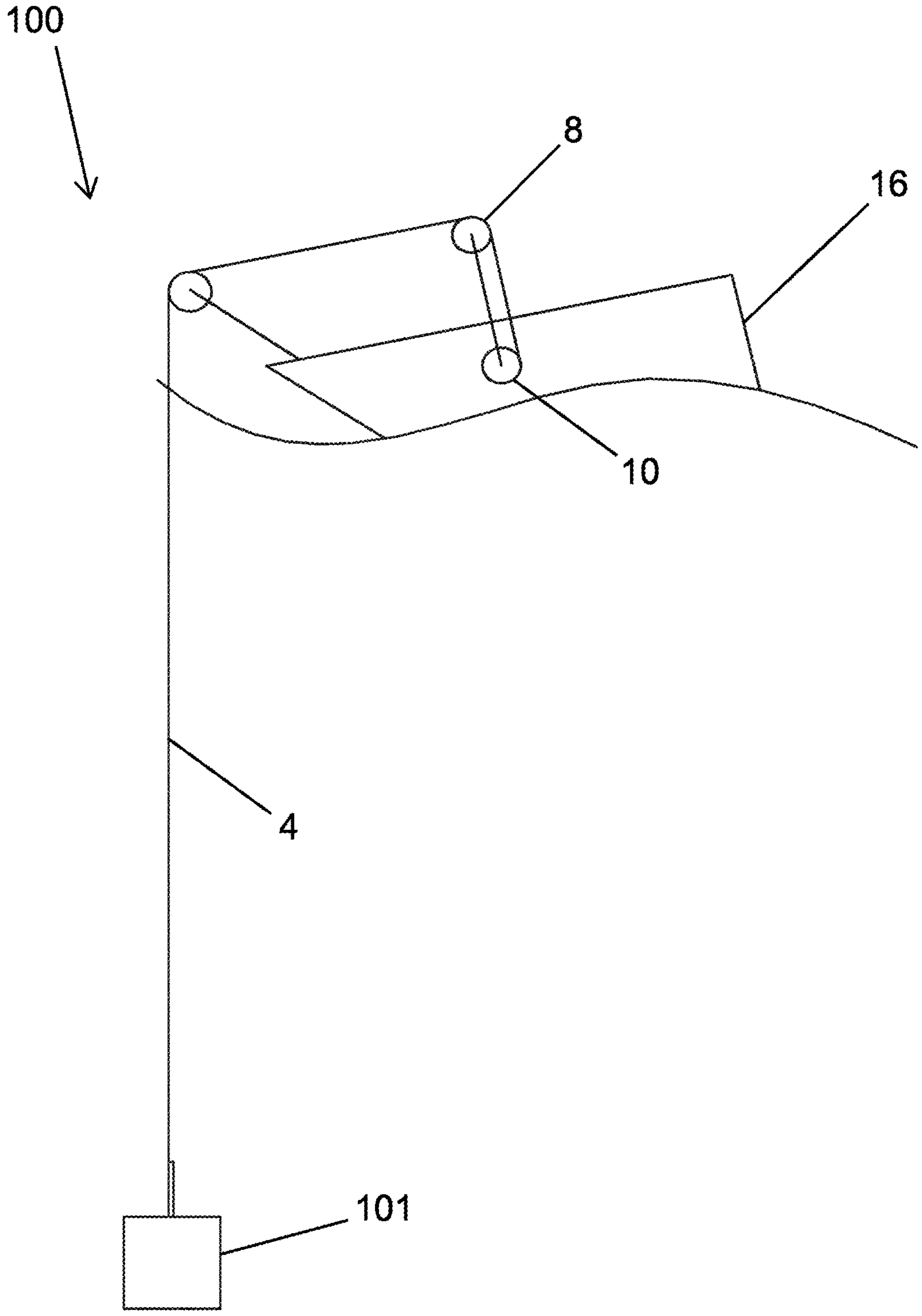
FIG. 3 illustrates the device 100 in use in the inertial phase at the trough of a wave, where the pressure receptacle 101 is tethered to the minimum distance from the floating body/vessel 16.
Figure 4:
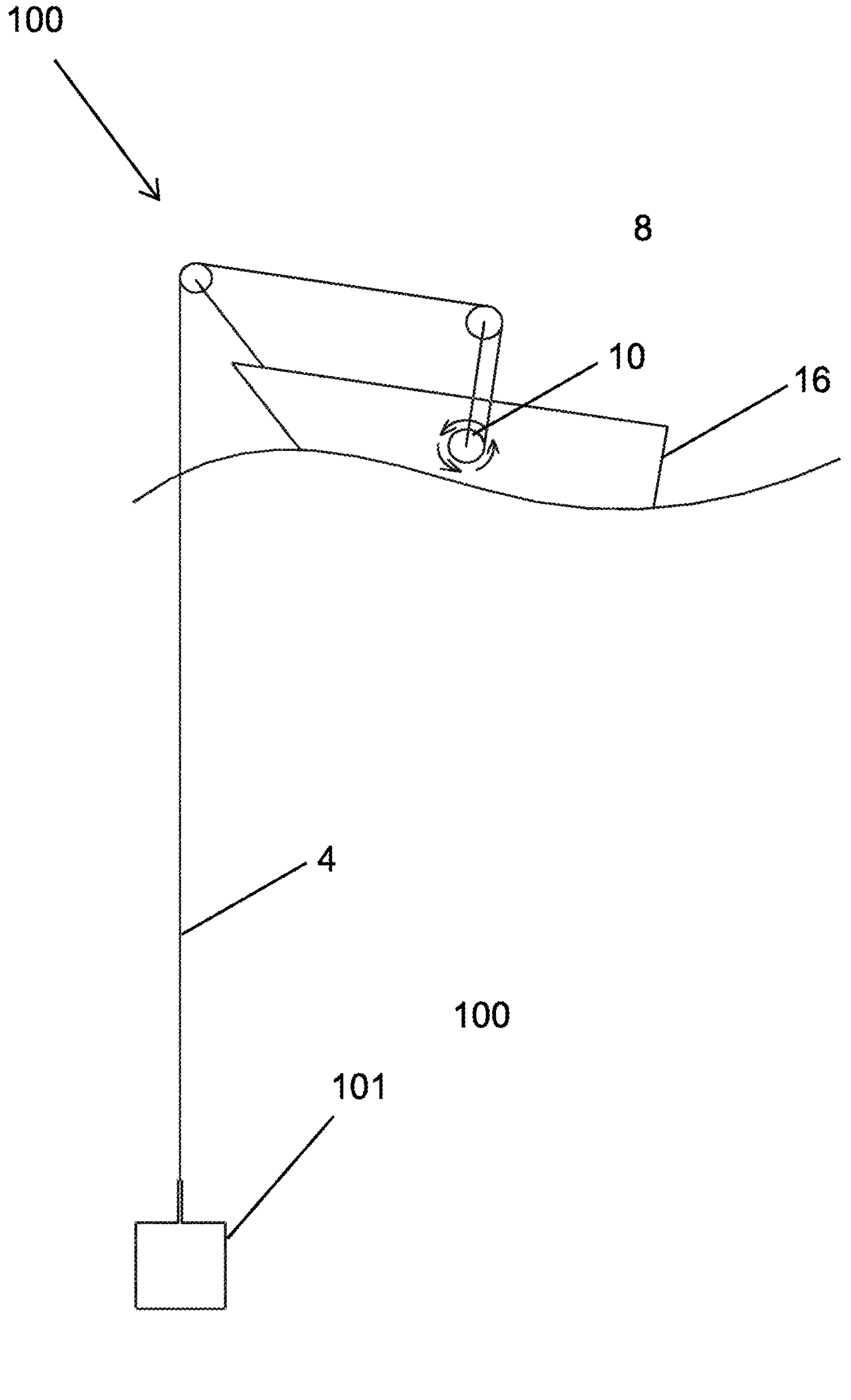
FIG. 4 illustrates the device 100 in use in the reeling out phase wherein the floating body 16 is at the crest of a wave. The pressure receptacle 101 remains in position, but the tension reeling cable 4 is being reeled out from the tension reeling device 8 thus rotating the converter/generator 10.
Figure 5:
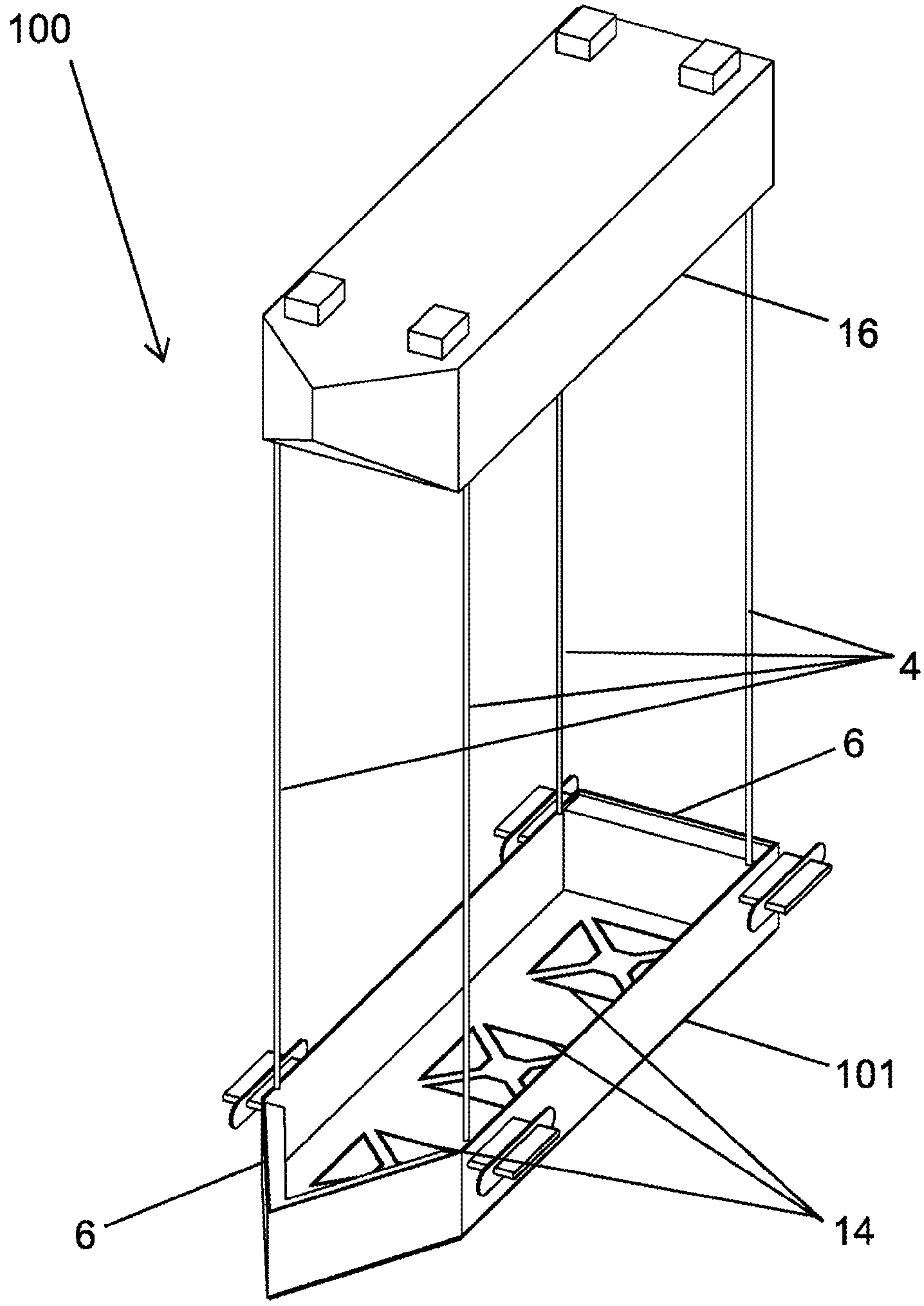
FIG. 5 illustrates an industrial variation of the floating body 16 wherein a large pressure receptacle 101 is suspended from a floating body 16 and wherein the large pressure receptacle 101 comprises integrated buoyancy aids 6 in the front and the back, a piercing bow to dissipate frontal underwater current if needed, stabilizing wings next to the tethering points and multiple check-valves 14 (the shape and size of both the floating body 16 and the pressure receptacle 101 are matched and therefore the pressure receptacle 101 could be extracted or retracted to regain mobility, if needed)

As illustrated in FIGS. 3 and 4, in its simplest form, the invention comprises the pressure receptacle 101 with the at least one integrated buoyancy aid 6 and, optionally the at least one check valve 14, the tethering cable 4, the tension reeling system 8 and the converter/generator 10, wherein the tethering cable 4 is an elongated length of high tensile strength material (such as for example stainless steel wire or polypropylene rope) which connects the pressure receptacle 101 to the floating body 16. The term cable will not be construed as limiting and the feature referred to as a tethering cable 4 may alternatively be wire, cable or a rope provided that it is of suitable tensile strength to withstand the tension reeling activity of the device 100. It is important that the tethering cable 4 exhibits minimal to no elasticity, in order for all the energy of the waves to be captured by the device 100 and the floating body 16. The tension on the tethering cable is controlled through a tension reeling system 8. The tension reeling system 8 is preferably constructed from spring loaded tensioning, however, the tension reeling system 8 is not limited to spring loaded tensioning and it will be appreciated that other forms of tensioning could be used.

As illustrated in FIG. 3 and FIG. 4, the pressure receptacle 101 is connected to a floating body 16. The floating body 16 may be a floating buoy, a vessel, a platform, a ship or any other type of floating body. The device 100 may be integrally connected to the floating body 16 or the floating body 16 may be provided separate to the device 100 and the device 100 may simply be located on the floating body 16.

In use, pressure receptacle 101 is located at a submerged depth below the surface of the body of water, in a depth where surface waves have no effect on the pressure receptacle 101. In this context, body of water will be understood to mean a lake or sea or ocean. The upper end, or plane, of the pressure receptacle 101 is open. The combination of an open upper end and at least one integrated buoyancy aid 6 balances the device 100 such that the pressure receptacle 100 net weight is minimal and the force on the tethering cable 4 not so significant that it retracts the tethering cable 4 from a limiter which is place on the tethering cable 4. The distance of extended tethering cable 4 is limited by a limiter on the tethering cable 4.

The minimum distance between the pressure receptacle 101 and the tension reeling device 8 can be easily adjusted by automation or by historical weather patterns/wave-swell data. With the above method, the pressure receptacle 100 remains vertically close to stationery in the body of the water and unaffected by the waves.

At the state of poise/inertia the tethering cable 8 is pulling on the buoyancy aided pressure receptacle 101 with equal force of strength to suspend the buoyancy aided pressure receptacle 101 thus compensating the pressure receptacles 101 weight and tethering at the minimal distance. In this position, the pressure receptacle 101 is ready to receive the water pressure with its check valves closed by inertial water pressure and gravity. The check valve 14 is a simple valve which allows a flow of water to pass through the pressure receptacle 101 in one direction (when the check valve is in the open position) but prevents a flow of water passing through the pressure receptacle 101 in an opposite direction (when the check valve is in the closed position). Typically, the check valve 14 is a pivotable flap. The flap is closed when the flap is in line with the bottom plate of the pressure receptacle 101 and the flap is open when the flap is not in line with the bottom plate of the pressure receptacle 101. It will be appreciated that the flap embodiment is simply one type of check valve and other types of check valves are also considered within the scope of the invention. The check valve 14 may also incorporate a form of passive or active modulation control.

Check valves 14 are suitable for pressure receptacles 101 of certain size, however, it will be appreciated that at a certain magnitude of pressure receptacle 101, the pressure receptacle 101 itself is of a mass such that check valves 14 are no longer required in order reduce upward motion of the pressure receptacle 101. Upscaling the size of the device 100 diminishes the need for check valves 14, as the increased added mass due to the increased size of the pressure receptacle 101, reduces the upward motion of the pressure receptacle 101 and thus the pressure receptacle 101 remains more or less stationery without any check valves 16. Thus, check valves 16 are appropriate for environments where smaller devices 100 are required, however, no check valves 16 are required for devices 100 which are of a larger magnitude.

As the floating body 16 is affected by waves, the floating body 16 may pitch, heave roll, yaw, sway or surge. The floating body 16 pitches and rolls, putting tension on the base of the pressure receptacle 101 or the at least one check valve 14 incorporated into the base (or bottom plane) of the pressure receptacle 101 and therefore also putting tension on the tethering cable 4. As the floating body 16 lifts towards the crest of the wave, the buoyant lifting motion on the floating body 16 creates tension on the pressure receptacle 101, by containing increased water pressure utilizing the pressure receptacle's 101 form, the open receiving upper end of the pressure receptacles 101 and the closed check valve 14 (if present) such that the tethering cable 4 is reeled out from the converter/generator 10, exerting rotational or cyclical movement within the converter/generator 10 thus generating energy which is captured and converted into useable electrical energy.

The energy harnessed by the device 100 and the floating body 16 can be distributed or transmitted by any conventional method of electrical energy distribution or it can alternatively be stored by means of a battery or used in the process of electrolysis. Any power generating means which requires rotation, gyration or motion to generate electricity may be used in conjunction with device 100.

Over the crest of the wave, the floating body 16, due to its mass and the gravitational force pulling on its mass, begins its downward motion, reducing the tension on the pressure receptacle 101. At this stage, the gravitational force on pressure receptacle 100 is greater than the vertical pulling force of the tethering cable 4 and the tension reeling mechanism 8 so the tethering cable 4 is compensated back to its original minimum distance. The length of tethering cable 4 extended is limited by the increasing force of the tension reeling mechanism 8, whilst the check-valves 14 remain partially open due to the downward draught and skirts channelling the body of water below the pressure receptacle 101 through check valves. The open check valves 14 aiding the pressure receptacle 101 to return to its initial position, until the next cycle when the check valves 14 close and the water pressure increases. The above upward and downward motions are repeated in a cyclical matter.

Figure 6:
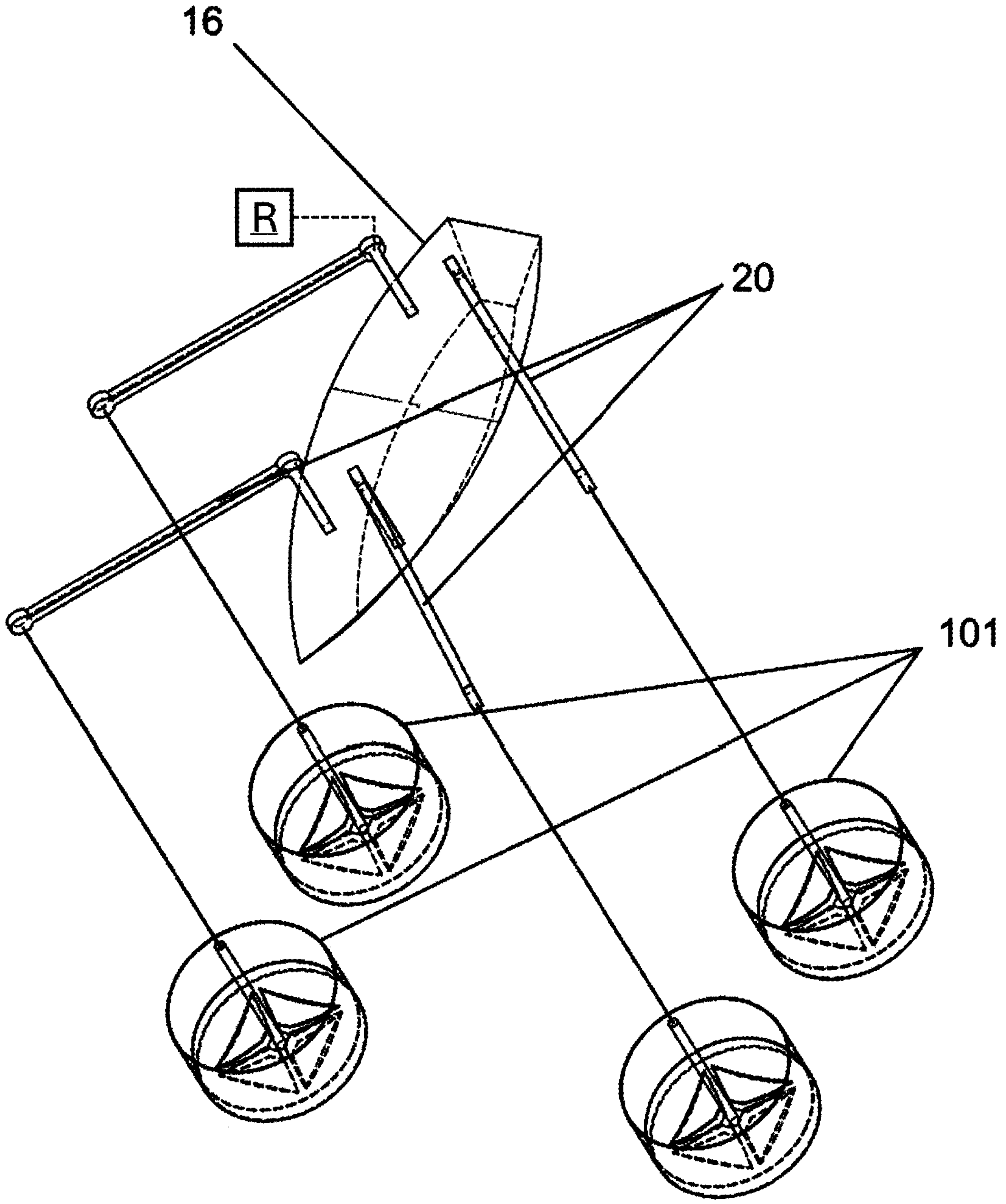
FIG. 6 illustrates an alternative embodiment of the device 100 according to the invention (to be used in conditions where pitching and rocking motions are dominant) wherein the pressure receptacles 101 comprise parabolic bases and the pressure receptacles 101 are arranged in a configuration with a 45 degree angle to the central axis of the floating body 16.
Figure 7:
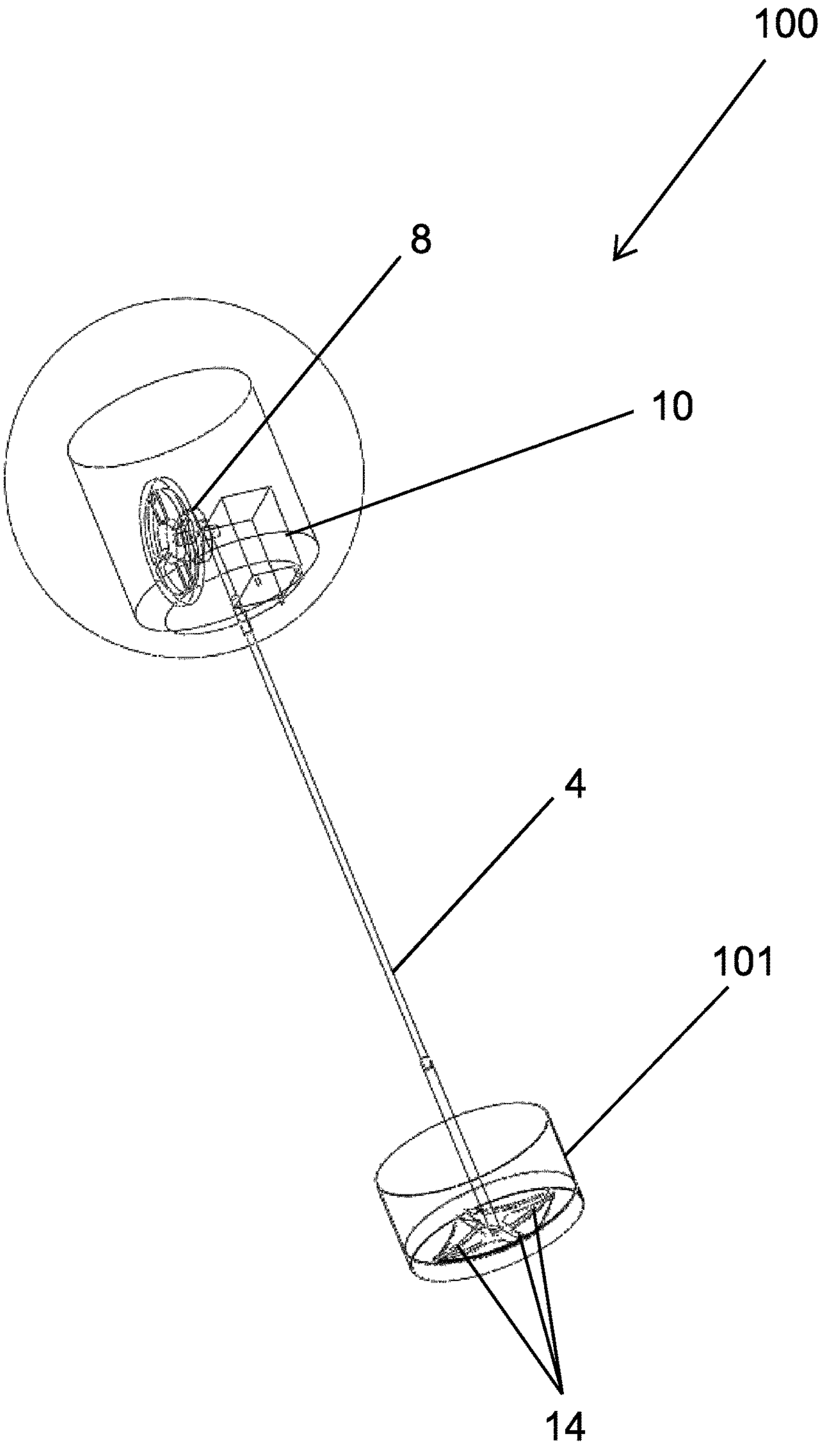
FIG. 7 illustrates an alternative embodiment of a device 100 according to the invention which is capable of submersion if sea/weather conditions require, wherein the floating body 16 is an inflatable/deflatable balloon type of body comprising an integrated power generator 10 and flywheel, a tension reeling unit 8 and a tethered pressure receptacle 101.
Figure 8:
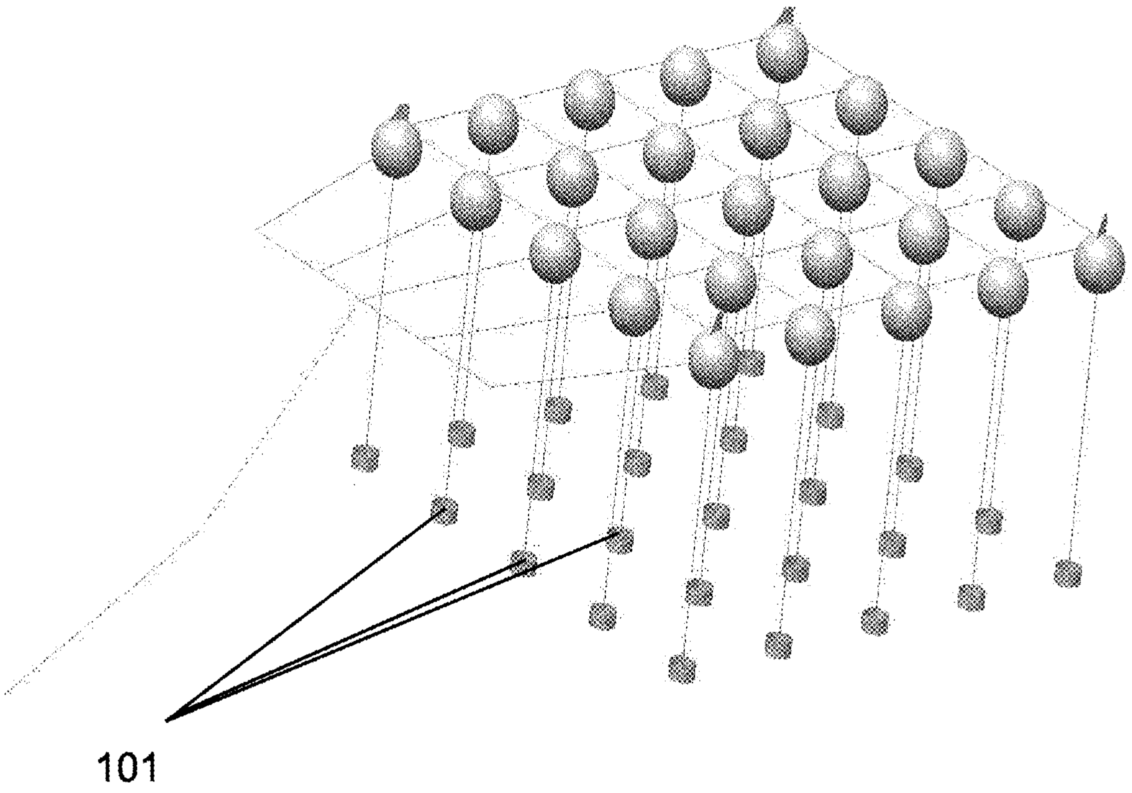
FIG. 8 illustrates the device 100 of FIG. 7 wherein a plurality of floating bodies 16 are joined together to form a wave energy conversion farm.

The converter 10 could equally be at least one hydraulic arm 20 as shown in FIG. 6, where the hydraulic arm 20 contracts and retracts in a cyclical manner as the tension on the tethering cable 4 increases and decreases due to the motion of the floating body 16 thus activating a rotor by hydraulic means. The orientation of the hydraulic arms 20 is preferably at an angle of 45° to the centreline of the floating body 16 thus enabling the device 100 to benefit from both pitch and heave motions, thus providing optimal efficiency. The hydraulic arms 20 may additionally comprises vertical extensions. Such a vertical extension increases the height of the centre of gravity of the floating body 16. An increased centre of gravity of the floating body 16 means that the floating body 16 will be more effected by the motion of the waves, and thus rolling motions of the smaller waves will be magnified. The hydraulic arms could also be adjustable such that different orientations can be chosen depending on the environmental conditions.

The invention claimed is:

1. A device (100) for harnessing kinetic wave energy and converting said kinetic wave energy into electrical energy, the device (100) comprising:

a pressure receptacle (101) comprising;

a substantially vertical impervious sidewall through which fluids cannot pass;

at least one integrated buoyancy unit (6) on the substantially vertical impervious sidewall;

a base which is connected to the substantially vertical impervious sidewall to form a closed end; and an open upper end;

a tethering cable (4);

a tension reeling system (8) comprising a spring loaded tensioning mechanism;

a converter (10) comprising a flywheel or a hydraulic arm for converting kinetic energy translated from wave motion into electrical energy; and wherein, in use, the pressure receptacle (101) is connected in tension within a water column via the tethering cable (4) to the tension reeling system (8) in the converter (10) which, in use, is located on a floating body (16), such that the pressure receptacle (101 remains in position while fluctuations of waves cause movement of the floating body (16) on which the converter (10) is located, thus varying the tension in the tethering cable (4) in a cyclical manner to convert kinetic wave movement into electrical energy;

wherein the tension reeling system (8) is coupled to the converter (10) such that extension of the tethering cable (4) reels out the tethering cable (4) from the tension reeling system (8) and imparts rotational or cyclical movement to the converter (10) to generate electrical energy, and retraction of the tethering cable (4) is controlled by an increasing force exerted on the tethering cable (4) by the spring loaded tensioning mechanism (8) to return the tethering cable (4) to a minimum length; and wherein, a flow of water through the pressure receptacle (101) on upward wave movement increases pressure on the pressure receptacle (101) thus resulting in an extension of the tethering cable (4) and flow of water through the pressure receptacle (101) on downward wave movement decreases pressure on the pressure receptacle (101) thus resulting in a retraction of the tethering cable (4).

2. The device (100) of claim 1, wherein the base of the pressure receptacle (101) comprises at least one check valve (14).

3. The device (100) of claim 1, wherein the converter (10) comprises a flywheel.

4. The device (100) of claim 1, wherein the converter (10) comprises a hydraulic arm.

5. The device (100) of claim 1, wherein the tethering cable (4) is fitted with a variable tension mechanism.

6. The device (100) of claim 1, wherein the integrated buoyancy unit (6) comprises non elastic sidewalls.

7. The device (100) of claim 1, wherein the at least one check valves (14) comprises a passive or active means of modulation.

8. The device (100) of claim 1, comprising a plurality of pressure receptacles (101) and one or more converters (10) located on a floating body.

9. The device (100) of claim 1, wherein the pressure receptacles (101) are integrated together into a single unit.

10. The device (100) of claim 1, comprising a plurality of pressure receptacles (101) and one or more converters (10) located on a plurality of floating bodies (16).

11. The device (100) of claim 1, comprising a means of attaching the device (100) to a floating body (16).

12. The device (100) of claim 1, wherein the device (100) comprises an inflatable or deflatable submergible floating body (16).

13. The device (100) of claim 1, wherein the device (100) comprises a means of storage or distribution of energy which is connected to the converter (10).

14. A farm device for harnessing kinetic wave energy and converting said kinetic wave energy into electrical energy comprising a plurality of devices (100) according to claim 1, wherein the devices (100) are interconnected.

15. A method of harnessing wave energy from a particular location and converting said wave energy into electrical energy using the device (100) according to claim 1, the method comprising the following steps:

i. assessing a wave environment of the location, via one or more of: monitoring wave movement using motion sensors; monitoring velocity of components of the device (100) using velocity sensors; monitoring energy generated by the device (100) using energy sensors; measuring acceleration of the device (100) using a three-axis accelerometer, and using wave forecast data; wherein said assessing is used to predict wave types, wave heights, and a suitable floating body (16) for the location;

ii. based on wave environment, selecting: a size and strength of the pressure receptacle (101) and buoyancy units (6); and a length of the tethering cable (4) for use with the floating body (16) having buoyancy;

iii. connecting the device (100) to the floating body (16);

iv. connecting the floating body (16) to a mooring point such that the device (100) is fixed in the location and is able to sway; and v. connecting the converter (10) to a means of storage or distribution of energy.

* * * * *